United States Patent [19]

Yates et al.

[11] 3,853,716

[45] Dec. 10, 1974

[54] ELECTROLYTIC COPPER STAINPROOFING PROCESS

[75] Inventors: Charles B. Yates; Adam M. Wolski, both of Edgewater Park, N.J.

[73] Assignee: Yates Industries, Inc., Bordentown, N.J.

[22] Filed: Sept. 8, 1972

[21] Appl. No.: 287,437

[52] U.S. Cl. .................................. 204/28, 204/56 R
[51] Int. Cl. ............................................ C23b 11/00
[58] Field of Search ............. 204/56 R, 28; 156/150; 148/62

[56] References Cited

UNITED STATES PATENTS 3,625,844 12/1971 McKean ............................ 204/56 R

*Primary Examiner*—R. L. Andrews
*Attorney, Agent, or Firm*—Lane, Aitken, Dunner & Ziems

[57] ABSTRACT

An electrolytic process for imparting stain resistance to copper sheet by immersing the copper sheet in an electrolyte containing chromate anions that is sufficiently alkaline to cause precipitation of copper and chromium cation impurities and rendering the copper sheet cathodic to cause reduction of the chromate anions at the surface thereof. The stainproofed copper sheet and laminates thereof.

6 Claims, No Drawings

ELECTROLYTIC COPPER STAINPROOFING PROCESS

BACKGROUND OF THE INVENTION

The present invention relates to an improved method for stainproofing copper sheet materials.

Copper foil is commonly manufactured by means of electrolytic and rolling processes for a wide variety of end uses, including printed circuitry. One problem faced in the manufacture of copper foil is the staining of the copper foil surface which may occur before the time of use by the ultimate purchaser. The stain results from the exposure of the copper foil to normal atmospheric and other conditions. The staining is particularly undesirable when the foil is intended for certain end use applications such as printed circuitry. Staining is also undesirable from the point of view of aesthetics and customer appeal.

The prior art discloses a variety of procedures for stainproofing copper foil. While the prior art procedures have generally been successful in stainproofing copper foil, they have often created one or more collateral problems negatively affecting the suitability of the treated copper foil for use in printed circuit applications and the like. These negative collateral effects produced by the prior art procedures include:

a. a decrease in the bond strength of stainproofed foil in laminates;

b. an increase in the etching resistance of the copper foil;

c. a decrease in the solvent resistance of the adhesive treatment interface; and/or d. a decrease in the solderability of the shiny side of the copper foil.

U.S. Pat. No. 3,625,844, issued Dec. 7, 1971 to Walter A. McKean, discloses a method of stainproofing copper foil involving the electrolytic treatment of the copper foil in an aqueous electrolyte under critical conditions of hexavalent chromium ion concentration (0.4–0.6 g/l), cathode current density (2–4 amps/ft$^2$) and treatment time (6–8 sec.). While the McKean process successfully avoids the problems noted above in connection with the standard prior art stainproofing procedures, the process results in a build-up of copper and chromium (chromous) cations in the electrolyte bath which interfere with the effectiveness of the stainproofing. To avoid this problem associated with the McKean process, it has been found necessary to continuously drain off a portion of the electrolyte to keep the concentration of copper and chromium cations at an acceptably low level.

SUMMARY OF THE INVENTION

In accordance with the present invention, a novel stainproofing technique is provided which avoids all of the above-noted problems and which provides a copper foil with a finish having superior tarnish and oxidation resistance. The technique of this invention involves rendering the copper sheet cathodic and passing the copper sheet through an aqueous electrolyte containing hexavalent chromium ion-containing anions and being of sufficient alkalinity to cause precipitation of copper and chromium cations.

OBJECTS AND ADVANTAGES OF THE INVENTION

Accordingly, it is an object of the present invention to provide a novel stainproofing technique for treatment of copper foil to optimize the surface characteristics of the foil to render it particularly suitable for use in printed circuit applications.

It is a further object of the present invention to provide an improved electrolyte bath for stainproofing copper foil.

It is yet another object of the present invention to provide a stainproofed copper foil product particularly suited for use in printed circuit laminates.

Other objects and advantages of the present invention will become apparent from the detailed description to follow taken in conjunction with the appended claims.

DETAILED DESCRIPTION OF THE INVENTION

As previously noted, the present invention involves an improved stainproofing technique for sheet copper. It has been found that a copper foil having the desired surface characteristics can be obtained by rendering the foil cathodic and immersing it in an aqueous electrolyte containing hexavalent chromium ion-containing anions and maintaining the aqueous electrolyte in a strongly alkaline state to cause precipitation of any cation impurities, principally copper and chromium (chromous) cations.

While electrodeposited copper foil is the preferred subject of the stainproofing of the present invention (particularly for printed circuit applications), other types of sheet copper (such as rolled foil) may also be treated in accordance with the present invention.

In one embodiment of the present invention, an elongated sheet of copper is passed through an aqueous electrolytic bath containing approximately 2–20 g/l chromic acid (calculated as $CrO_3$), and preferably 10 g/l chromic acid. The copper sheet is rendered cathodic with respect to the anode or anodes immersed in the bath by contact with conducting rollers. The chromium in the bath is present in its hexavalent state in the form of chromate anions. In accordance with the present invention, the pH of the bath must be strongly alkaline, with a pH within the range of 12–14, and preferably about 14.

The temperature of the electrolytic bath may be 120° to 170°F and is preferably maintained at about 150°F. The speed of the foil movement through the bath should be regulated so that the duration of the dip for any one unit area of the foil is 4–8 sec., and preferably about 6 seconds. The cathode current density should be within the range of 10–50 amps/ft$^2$, and preferably 30 amps/ft$^2$.

A caustic concentration of 20 g/l will give a bath pH of approximately 14, while a caustic concentration of 7 g/l will give a bath pH of approximately 12. The preferred caustic concentration is about 20 g/l. Although sodium hydroxide is the preferred alkaline material, from the viewpoint of cost and availability, other water soluble alkali materials (potassium hydroxide, etc.) may be used.

Table 1 below shows the operating parameters that should be used for best results as well as the preferred operating conditions.

TABLE 1

| Condition | Operating Range | Preferred |
|---|---|---|
| Cathode current density (amps/ft²) | 10–50 | 30 |
| Electrolyte Temperature (°F) | 120–170 | 150 |
| Chromic Acid concentration (gms/liter calculated as $CrO_3$) | 2–20 | 10 |
| Duration of Dip (sec.) | 4–8 | 6 |
| pH | 12–14 | 14 |
| Caustic Concentration (gms/liter) | 7–20 | 20 |

The particular apparatus employed to treat the surfaces of the copper foil in the manner described above forms no part of the present invention. However, the process can be conveniently conducted using apparatus such as is disclosed in U.S. Pat. No. 3,625,844, issued Dec. 7, 1971 to Walter A. McKean, the teachings of which are hereby incorporated by reference. Such apparatus involves the use of plate anodes with the copper foil passed in serpentine fashion in proximity to such anodes. The copper foil is made cathodic with respect to the anodes by appropriate contact between the copper and conducting rollers.

Copper and chromium electrolyte contaminants are rendered completely insoluble by the process of the present invention, and consequently, the bath can be 100% recirculated on itself with some filtering and only occasional need to adjust the pH slightly or to add a little chromate. This advantage avoids the ion exchange regeneration required by prior art processes and, therefore, the consumption of chromate salts can be substantially reduced.

The stainproofing of the present process is much less sensitive to the presence of acidic residues on the foil prior to entering the stainproofing bath since these residues are instantly neutralized by the strongly alkaline bath. This process offers the further advantage that the two most common contaminants in electrolytic stainproofing processes, copper and chromium cations, are removed from solution by precipitation.

It is believed that the composition of the protective deposit on the surface of the treated copper sheet of this invention differs significantly from the compositions of those produced by the prior art processes wherein virtually the only available anion for precipitation is the chromate radical. In the present invention the surface deposit may incorporate considerable amounts of hydroxides [probably $Cr(OH)_3$ and/or $Cr(OH)(CrO_4)$] as well as chromates [$Cr_2(CrO_4)_3$] since the ($OH^-$) concentration is very high. This type of surface deposit affords improved stain resistance over those produced by the prior art processes.

The reaction formulas for the process of the present invention are believed to be as follows:

a. Reduction of the chromate ion (half equation)

$$CrO_4^{=} + 8H^+ + 3e^- \rightarrow Cr^{3+} + 4H_2O$$

b. Deposition of film on the foil:

$$Cr^{3+} + 3OH^- \rightarrow Cr(OH)_3$$

$$2Cr^{3+} + CrO_4^{=} \rightarrow Cr_2(CrO_4)_3$$

As previously mentioned, it is within the contemplation of the present invention not only to provide a novel method for producing copper foil having good stain resistance in printed circuit applications and a copper foil so treated, but also to provide laminates comprising copper foil treated in the prescribed manner and bonded to an appropriate substrate. As will be apparent to those skilled in the art, the particular substrate used in this laminate will vary depending upon the use for which the laminate is intended and the service conditions under which such laminate will be used. Particularly appropriate substrates which adapt the laminate for use in forming printed circuits include non-flexible supports such as Teflon-impregnated fiber glass ("Teflon" is the trademark for polytetrafluoroethylene), "Kel-F"—impregnated fiber glass ("Kel-F" is a trademark for certain fluorocarbon products including polymers of trifluorochloroethylene and certain copolymers) and the like. Flexible substrates include polyimides such as those known under the designations "Kapton" and "H-Film" (both are manufactured by duPont and are polyimide resins produced by condensing a pyromellitic anhydride with an aromatic diamine).

The adhesives used to bond the treated copper foil to the substrate are those conveniently used for the specific application intended. "FEP" (a fluorinated ethylene propylene resin in the form of a copolymer of tetrafluoroethylene and hexafluoropropylene having properties similar to Teflon) is particularly appropriate for the "Teflon" and "Kel-F" substrates. Conventional epoxy resins are suitable for other substrates. The method of bonding the copper to the substrate is conventional and forms no part of the present invention, typical details of such bonding being set forth, for example, in U.S. Pat. No. 3,328,275 issued June 27, 1967 to Warren V. Waterbury, the teachings of which are hereby incorporated by reference.

EXAMPLE

In a specific example of the process of the present invention, 1 ounce copper foil (which had been previously electro-chemically treated to improve bond strength) is passed in serpentine fashion, in the manner indicated above, past insoluble lead anodes immersed in an aqueous chromic acid electrolyte containing 20 g/l sodium hydroxide 10 g/l of hexavalent chromium ions (determined as $CrO_3$). The electrolyte temperature is 150°F, the pH is 14, the cathode current density is 30 amps/ft² and the copper is immersed in the electrolyte for 6 seconds. The resulting copper foil shows excellent stain resistance as measured by a standard sulfide stain resistance test and passes a standard etchability test employed to determine suitability for printed circuit applications. The standard sulfide stain resistance test and the standard etching test are described in detail in U.S. Pat. No. 3,625,844, previously noted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An electrolytic process for imparting stain resistance to sheet copper comprising:

1. immersing said copper sheet in an electrolyte comprising an aqueous solution containing hexavalent chromium ion-containing anions, said electrolyte being sufficiently alkaline to cause precipitation of copper and chrome cations; and 2. rendering said copper sheet cathodic to cause reduction of said anions at the surface of said copper sheet.

2. The process of claim 1 wherein the pH of said electrolyte is in the range of about 12 to about 14.

3. The process of claim 1 wherein the pH of said electrolyte is about 14.

4. The process of claim 1 wherein the cathode current density is about 10–50 amps/$ft^2$, the temperature of the electrolyte is about 120°–170°C, the pH of the electrolyte is about 12–14, the chromate concentration is about 2–20 g/l (calculated as $CrO_3$), and the immersion time is about 4–8 seconds.

5. The process of claim 1 wherein said sheet copper is copper foil.

6. The product of the process of claim 1.

* * * * *

UNITED STATES PATENT OFFICE
CERTIFICATE OF CORRECTION

Patent No. 3,853,716 Dated December 10, 1974

Inventor(s) Charles B. Yates and Adam M. Wolski

It is certified that error appears in the above-identified patent and that said Letters Patent are hereby corrected as shown below:

Claim 4, column 6, line 2

"$120^{o}$-$170^{o}$C" should read --$120^{o}$-$170^{o}$F--.

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*

USCOMM-DC 60376-P69
☆ U.S. GOVERNMENT PRINTING OFFICE : 1969 O—366-334.